(12) United States Patent
Cho (10) Patent No.: US 11,926,194 B2
(45) Date of Patent: Mar. 12, 2024

(54) FRONT WING APPARATUS FOR CAR AIR VENT

(71) Applicant: HYUNDAI MOBIS Co., Ltd., Seoul (KR)

(72) Inventor: Young Min Cho, Cheonan-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 105 days.

(21) Appl. No.: 17/557,457

(22) Filed: Dec. 21, 2021

(65) Prior Publication Data

US 2023/0039358 A1    Feb. 9, 2023

(30) Foreign Application Priority Data

Aug. 6, 2021 (KR) .......................... 10-2021-0104145

(51) Int. Cl.
*B60H 1/34* (2006.01)

(52) U.S. Cl.
CPC ..... *B60H 1/3421* (2013.01); *B60H 2001/3464* (2013.01); *B60H 2001/3471* (2013.01)

(58) Field of Classification Search
CPC .......... B60H 1/34; B60H 1/3414–3428; B60H 1/345; B60H 2001/3464–3492
See application file for complete search history.

(56) References Cited

U.S. PATENT DOCUMENTS

| 4,043,258 A * | 8/1977 | Zitko ................... B60H 1/3428 454/319 |
| 2016/0200177 A1 | 7/2016 | Uchiyama |
| 2017/0166035 A1 | 6/2017 | Ahn et al. |

FOREIGN PATENT DOCUMENTS

| CN | 211166345 U | 8/2020 |
| EP | 3626493 A1 | 3/2020 |
| JP | 7-40922 Y | 1/1992 |
| JP | 6-191266 A | 7/1994 |
| JP | H06191266 A * | 7/1994 |

* cited by examiner

*Primary Examiner* — Edelmira Bosques
*Assistant Examiner* — Michael James Giordano
(74) *Attorney, Agent, or Firm* — Morgan, Lewis & Bockius LLP (57) ABSTRACT

Provided is a front wing apparatus which includes a plurality of front wings, a lower spacer which is rotatably coupled to lower portions of the front wings and laterally connects the lower portions of the front wings, an upper spacer which is rotatably coupled to upper portions of the front wings and laterally connects the upper portions of the front wings, a spacer bar which vertically connects the lower spacer and the upper spacer, and a wing knob bar to which the spacer bar is fitted and which is coupled to the wing knob, wherein, when the wing knob is rotated in a left-right direction, the spacer bar fitted to the wing knob bar is moved in the left-right direction, and the front wings rotatably coupled to the lower spacer and the upper spacer connected to the spacer bar are rotated in the left-right direction.

17 Claims, 12 Drawing Sheets

Prior Art

FIG. 2B

Prior Art

FIG. 2C

Prior Art

FIG. 2D

Prior Art

FRONT WING APPARATUS FOR CAR AIR VENT

CROSS-REFERENCE TO RELATED APPLICATION

This application claims the benefit under 35 U.S.C. § 119(a) of Korean Patent Application No. 10-2021-0104145, filed on Aug. 6, 2021 in the Korean Intellectual Property Office, the entire disclosure of which is incorporated herein by reference for all purposes.

BACKGROUND

1. Field of the Invention

The present invention relates to a car air vent (blower port), and more specifically, to a front wing apparatus for a car air vent.

2. Discussion of Related Art

Figure 1:
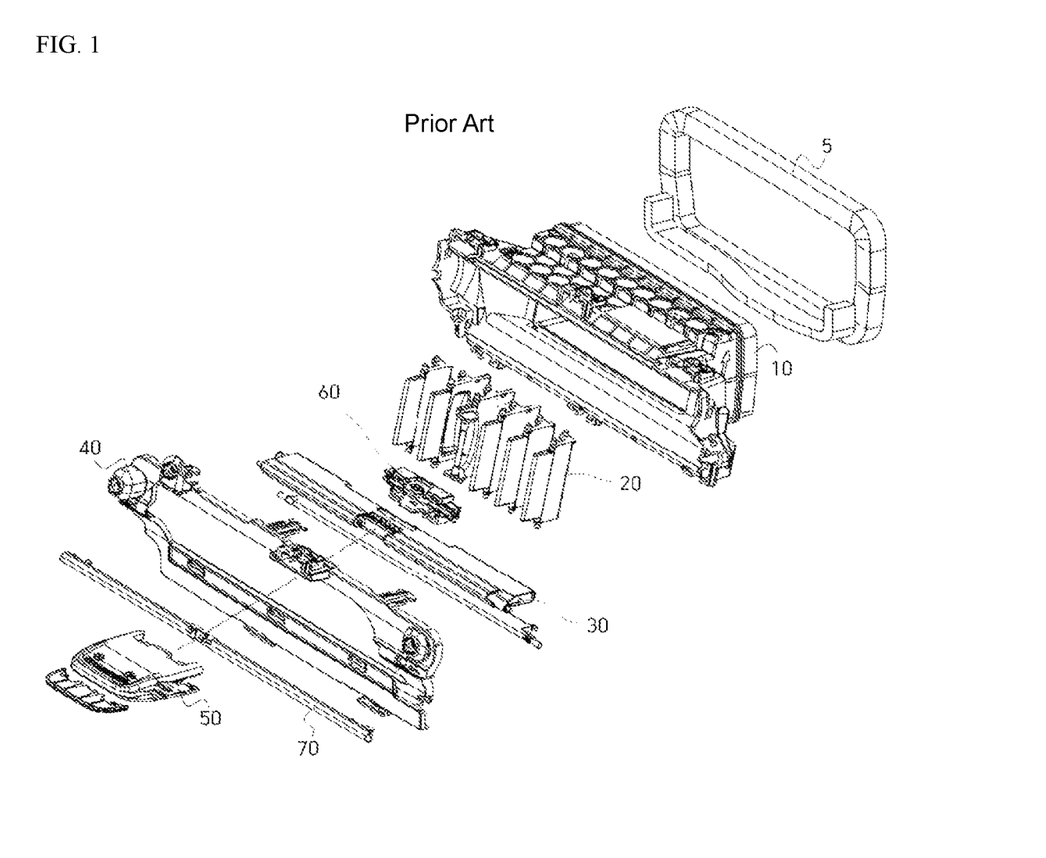
FIG. 1 is a schematic configuration view illustrating a general slim type air vent.

An air vent (blower port) positioned in a car interior is generally formed in a structure shown in FIG. 1. FIG. 1 shows a schematic structure of a recent slim type air vent.

Front wings 20 are installed at a front side (in a direction toward a bonnet of a car body) in a duct housing 10, and rear wings 30 are installed at a rear side (in a direction toward a driver seat). The front wings 20 have a structure in which a plurality of vertically arranged wind wings rotate in a left-right direction, and the rear wings 30 have a structure in which a plurality of wind wings (in the slim type of FIG. 1, one wind wing) rotate vertically. The front wings 20 and the rear wings 30 are assembled in a duct housing 10 to form an air vent assembly. The air vent assembly is ultimately assembled with a bezel 40 of a car. The bezel 40 is a design element constituting a part of a dashboard in front of the driver seat. Meanwhile, a duct pad 5 is attached to the front of the duct housing 10 (in a forward direction of the car). In addition, a strip type decoration 70 may be attached to the front of the bezel 40 (that is, in front of the driver seat) according to design.

Lateral rotation adjustment of the front wing 20 and vertical rotation adjustment of the rear wing 30 are performed using a wing knob exposed toward the driver seat. The wing knob includes a rear wing knob 50 exposed toward the driver seat and a front wing knob 60 present in the duct housing 10 according to an embodiment thereof. In this case, the rear wing knob 50 and the front wing knob 60 may be manufactured as separate parts and assembled in the air vent assembly.

Figure 2A:
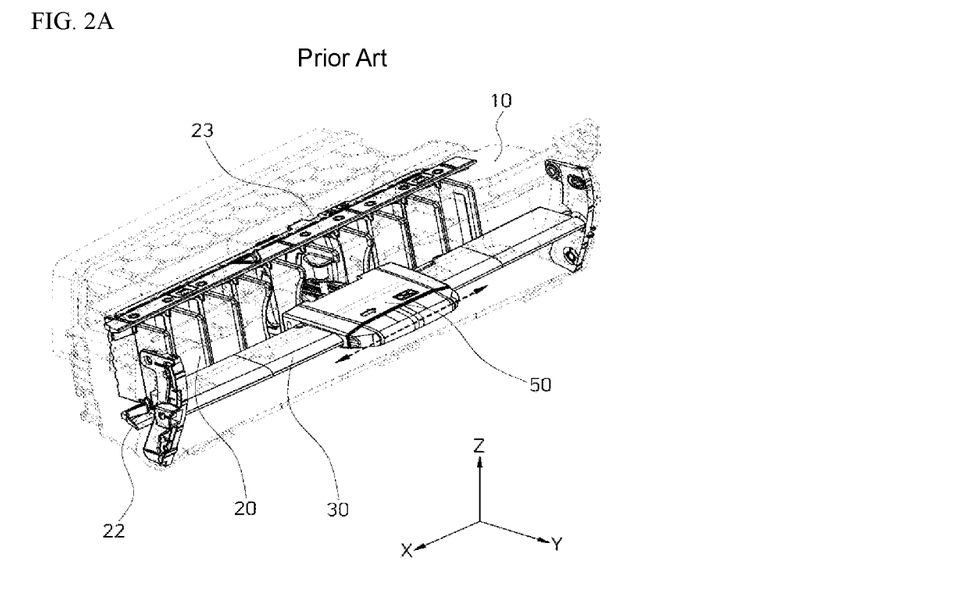
FIG. 2A is a perspective view illustrating a front wing (20) installed in a duct housing (10) when viewed from a driver seat side.

The structure of the front wing 20 will be described in more detail with reference to FIGS. 2A and 2B. FIG. 2A is a perspective view illustrating the front wing 20 installed in the duct housing 10 when viewed from the driver seat side, and FIG. 2B is a plan view illustrating the front wing 20 installed in the duct housing 10 when viewed from above.

In the following present specification, as illustrated in a lower portion of FIG. 2A, an X direction along a longitudinal side of the air vent assembly will be described as a lateral, left-right, or longitudinal direction, a Y direction between the front and the rear of a car will be described as a front-rear direction, and a Z direction along a short side of the air vent assembly will be described as a vertical or transverse direction. In addition, in FIG. 2A, a direction toward the front of the car means a —Y direction, and a direction toward the rear of the car means a +Y direction.

In FIG. 2A, the plurality of front wings 20 at a front side in the duct housing 10 are horizontally arranged between a lower spacer 22 disposed at a lower side and an upper spacer 23 disposed at an upper side and rotate in the left-right direction. In addition, the rear wing 30 is installed at the rear side in the duct housing 10 to rotate vertically. A user may adjust lateral rotation of the front wing 20 and vertical rotation of the rear wing 30 using a wing knob (for example, the rear wing knob 50).

Figure 2B:
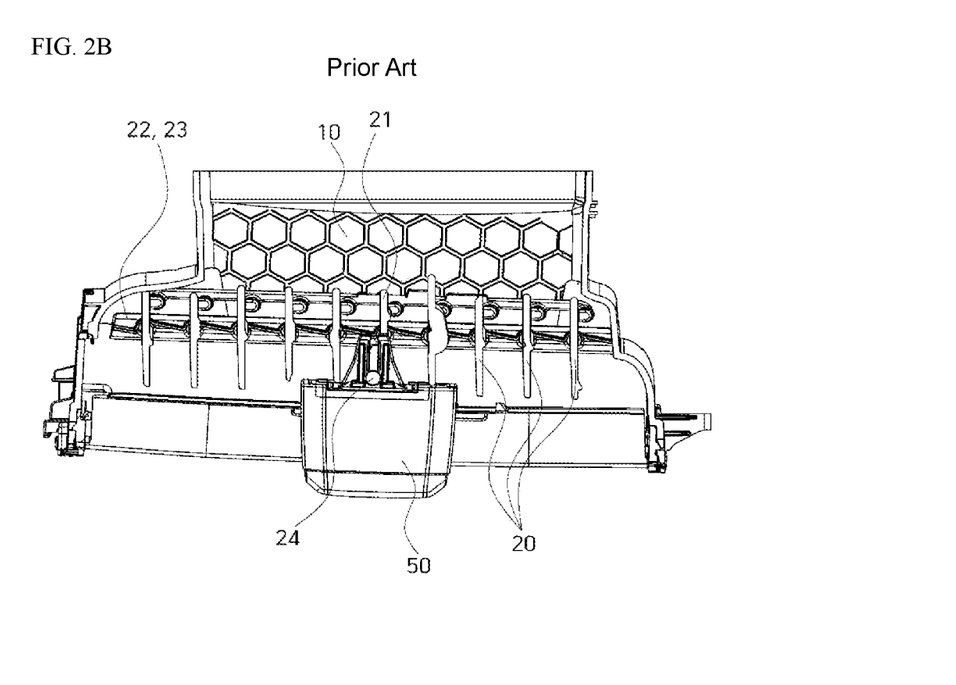
FIG. 2B is a plan view illustrating the front wing (20) when viewed from above.

To this end, as in FIG. 2B, lower portions and upper portions of the front wings 20 are rotatably coupled to the lower spacer 22 and the upper spacer 23, and the rear wing knob 50 is coupled to one central front wing 21. Structurally, since all of the front wings 20 are rotatably coupled between the lower spacer 22 and the upper spacer 23, when the user moves the rear wing knob 50 in the left-right direction to rotate the central front wing 21, all of the front wings 20 are rotated in the left-right direction.

A coupling structure of a wing knob bar 61 and the central front wing 21 will be described with reference to FIGS. 2C and 2D.

Figure 2C:
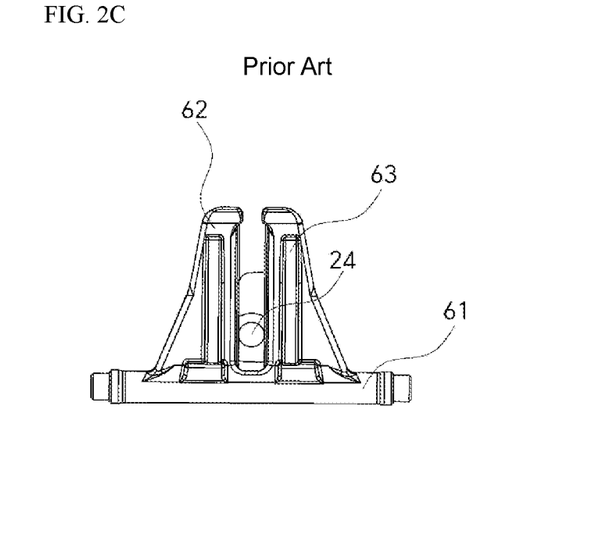
FIG. 2C is a plan view illustrating a wing knob bar (61)

As in FIG. 2C, the wing knob bar 61 is configured so that a first bar 62 and a second bar 63 protrude from the wing knob bar 61, and a front wing bar 24 of the central front wing 21 is inserted between the first bar 62 and the second bar 63. (The wing knob bar 61 is integrally formed with the rear wing knob 50 (see FIG. 2B) or coupled to the front wing knob 60 (see FIG. 1) coupled to the rear wing knob 50.)

Figure 2D:
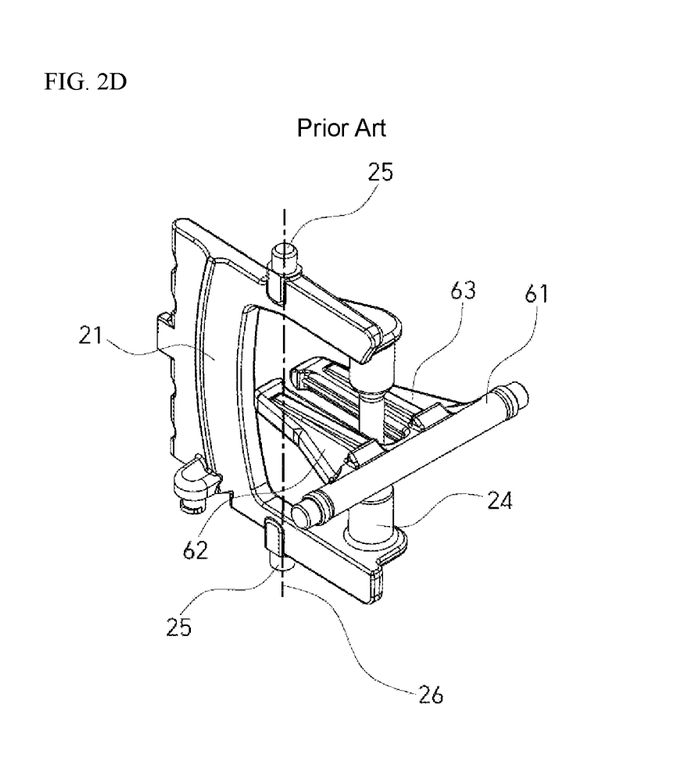
FIG. 2D is a perspective view illustrating coupling of the wing knob bar (61) and a central front wing (21)

Due to such a structure, as in FIG. 2D, when the user moves the rear wing knob 50 (see FIG. 2B) in the left-right direction, the wing knob bar 61 integrally formed therewith or separately formed and coupled thereto is moved in the left-right direction, and accordingly, while the front wing bar 24 of the central front wing 21 is moved in the left-right direction, the corresponding front wing 21 is rotated in the left-right direction about a rotation axis 26 provided by a hinge shaft 25. Accordingly, the lower spacer 22 (see FIG. 2A) and the upper spacer 23 (see FIG. 2A) rotatably coupled to upper and lower portions of the corresponding central front wing 21 move linearly in the left-right direction, and due to the linear movement thereof, all of the front wings 20 are rotated in the left-right direction.

SUMMARY OF THE INVENTION

The present invention is directed to providing an improved front wing structure in order to solve conventional problems of a front wing structure. The conventional problems are 1) degradation of wind directivity caused by cutting a front wing, which is applied to prevent interference when a wind direction is adjusted in a left-right direction, 2) generation of noise due to a gap caused by an injection tolerance, and 3) an appearance problem due to an externally exposed component and a decrease in air volume.

In order to solve the objectives, the present invention provides a front wing apparatus positioned in a duct housing of a car air vent and configured to be rotated in a left-right direction by a wing knob exposed to the outside of the duct housing.

According to one aspect of the present invention, there is provided a front wing apparatus including a plurality of front wings, a lower spacer which is rotatably coupled to lower portions of the plurality of front wings and laterally connects the lower portions of the plurality of front wings, an upper spacer which is rotatably coupled to upper portions of the plurality of front wings and laterally connects the upper portions of the plurality of front wings, a spacer bar which vertically connects the lower spacer and the upper spacer, and a wing knob bar to which the spacer bar is fitted and which is coupled to the wing knob, wherein, when the wing knob is rotated in a left-right direction, the spacer bar fitted to the wing knob bar is moved in the left-right direction, and the front wings rotatably coupled to the lower spacer and the upper spacer connected to the spacer bar are rotated in the left-right direction.

According to one embodiment, the front wing apparatus may further include lower hinge shafts protruding from the lower portions of the plurality of front wings, upper hinge shafts protruding from the upper portions of the plurality of front wings, lower hinge rails which are formed in a lower portion of the duct housing to guide the lower hinge shafts of the front wings, and upper hinge rails which are formed in an upper portion of the duct housing to guide the upper hinge shafts of the front wings.

According to another embodiment, the front wing apparatus may further include a lower hinge shaft protruding from the lower portion of one front wing of the plurality of front wings, an upper hinge shaft protruding from the upper portion of the one front wing, a lower hinge rail which is formed in a lower portion of the duct housing to guide the lower hinge shaft of the one front wing, an upper hinge rail which is formed in an upper portion of the duct housing to guide the upper hinge shaft of the one front wing, and a front wing link which rotatably connects the one front wing and the remaining front wings of the plurality of front wings.

According to still another embodiment, the front wing may include a lower rotating part formed in the lower portion to be rotatably coupled to the lower spacer and an upper rotation part formed on the upper portion to be rotatably coupled to the upper spacer, the lower spacer may include a lower rotation coupling part rotatably coupled to the lower rotating part, and the upper spacer may include an upper rotation coupling part rotatably coupled to the upper rotation part, wherein the lower rotation coupling part of the lower spacer may be formed without having a difference in level with respect to an upper surface of the lower spacer, and the upper rotation coupling part of the upper spacer may be formed without having a difference in level with respect to an upper surface of the upper spacer.

The structure and operation of the present invention will be further clarified through specific embodiments described below with reference to the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving the same will be clearly understood with reference to the accompanying drawings and the following detailed embodiments. However, the present invention is not limited to the embodiments to be disclosed and may be implemented in various different forms. The embodiments are provided in order to fully disclose the present invention and fully explain the scope of the present invention to those skilled in the art, and the scope of the present invention is defined by the appended claims. In addition, the terms used herein are provided only to describe the embodiments of the present invention and not for purposes of limitation. Unless the context clearly indicates otherwise, the singular forms include the plural forms. In addition, it will be understood that the terms "comprise" ("comprising" or like), when used herein, specify some stated components, steps, operations and/or elements but do not preclude the presence or addition of one or more other components, steps, operations and/or elements. Hereinafter, the exemplary embodiments of the present invention will be described with reference to the accompanying drawings. In the descriptions of the embodiments of the present invention, when specific descriptions of related well-known technologies or functions are deemed to unnecessarily obscure the gist of the present invention, they will be omitted.

First Embodiment—Front Wing Apparatus Having New Structure

As described with reference to FIGS. 2C and 2D, in a conventional structure, since a front wing bar 24 of a central front wing 21 is inserted into a space between a first bar 62 and a second bar 63 of a wing knob bar 61, the first bar 62 and the second bar 63 should protrude in a direction of a hinge shaft 25 of the central front wing 21, and furthermore, when the central front wing 21 is rotated in a left-right direction by the wing knob bar 61, the front wing bar 24 moves in a front-rear direction, and thus protruding lengths of the first bar 62 and the second bar 63 should be increased in order to compensate for a distance difference when the front wing bar 24 moves in the front-rear direction (structurally, when the protruding lengths are short, the wing knob bar 61 is easily separated therefrom). Accordingly, when the central front wing 21 coupled to the wing knob bar 61 rotates in the left-right direction, the central front wing 21 interferes with the first bar 62 and the second bar 63. In order to prevent the front wing 21 from interfering with the wing knob bar 61, a cutting space should be provided to the front wing 21 as in FIG. 2D. A cutting degree of the cutting space almost exceeds a central rotation axis 26. However, when the cutting space is provided as described above, although it is provided to adjust a wind direction, the wind direction is not adjusted by the central front wing 21 due to the cutting space, the wind linearly passes and is discharged, and thus a wind direction adjusted by other wings is influenced so that overall wind directivity of front wings 20 is degraded.

In order to solve such a problem, the first embodiment is proposed. According to the present embodiment, a front wing apparatus 200 having a new structure is provided as in FIG. 3.

Figure 3:
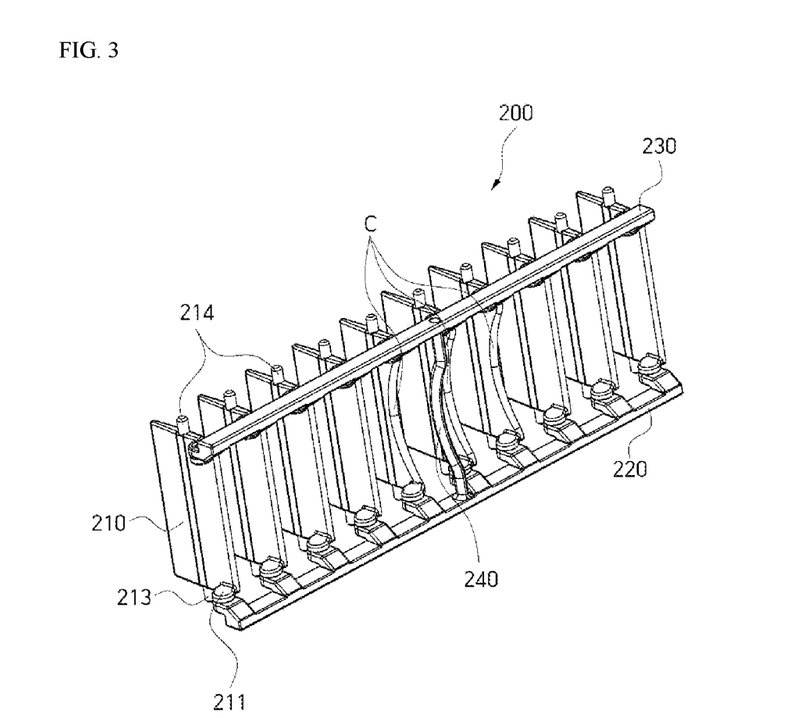
FIG. 3 is a perspective view illustrating a front wing apparatus (200) according to a first embodiment of the present invention.

FIG. 3 shows the front wing apparatus 200 according to the first embodiment. Corners of rear sides (in front of the driver seat) of lower portions of a plurality of front wings 210, which are vertically arranged, are rotatably coupled to a lower spacer 220, and corners of rear sides (in front of the driver seat) of upper portions of the front wings 210 are rotatably coupled to an upper spacer 230. The lower spacer 220 laterally connects the rear sides of the lower portions of all of the front wings 210, and the upper spacer 230 laterally connects the rear sides of the lower portions of all of the front wings 210. In addition, there is a spacer bar 240, which connects the lower spacer 220 and the upper spacer 230, in a central portion between the lower spacer 220 and the upper spacer 230. The spacer bar 240 is connected to a front wing knob 60 (see FIG. 1), and the front wing knob 60 is coupled to a rear wing knob 50 so that the spacer bar 240 moves in a left-right direction when a user moves the rear wing knob 50 in the left-right direction. Accordingly, the lower spacer 220 and the upper spacer 230 connected to the spacer bar 240 are guided by duct rails (which will be described below) formed in an upper portion and a lower portion of a duct housing 10 and are linearly, curvedly, and slidably moved.

In the present embodiment, there are only cut portions C cut in a semicircular shape by a small amount thereof at the rear sides of the front wings 210 adjacent to the spacer bar 240. This will be described below.

Figure 4:
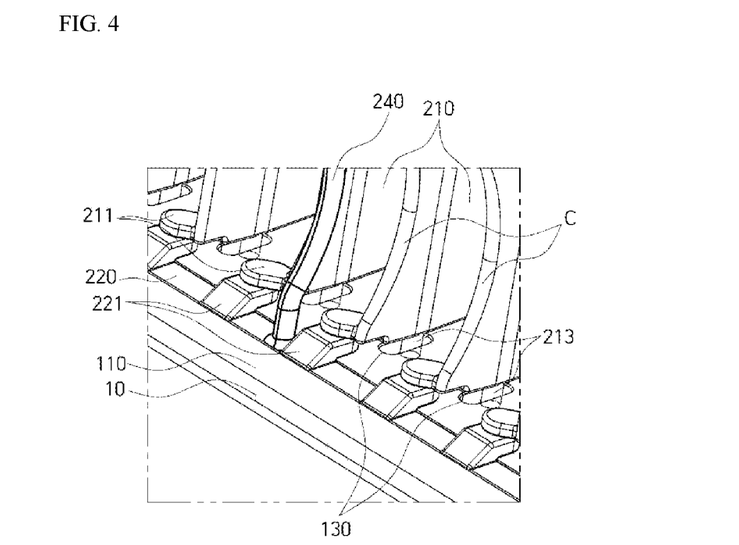
FIG. 4 is a lower perspective view illustrating a coupling relationship between a front wing (210) and a lower spacer (220) and a coupling relationship between the lower spacer (220) and a duct housing (10) according to the first embodiment.
Figure 5:
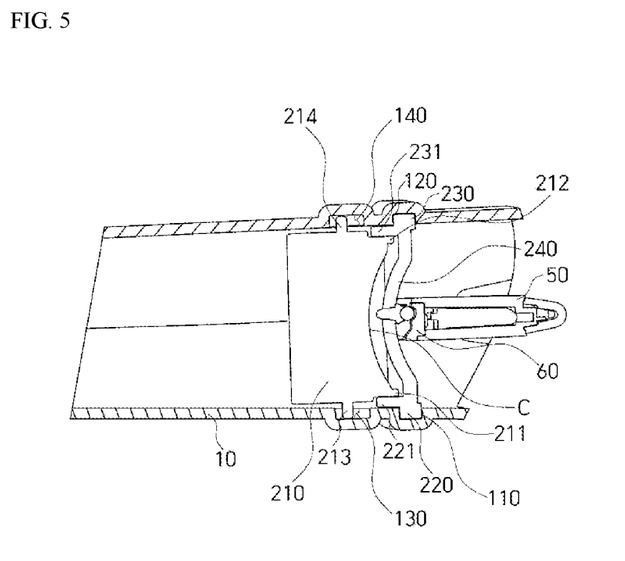
FIG. 5 is a cross-sectional view illustrating the front wing (210) according to the first embodiment in a front-rear direction.
Figure 6:
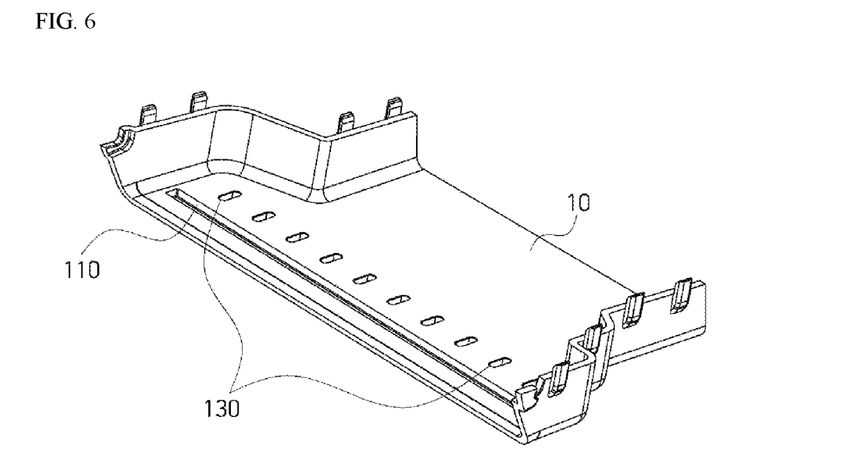
FIG. 6 is a perspective view illustrating a lower inner surface of the duct housing (10) in a state in which the front wing (210) and related components are removed according to the first embodiment.

FIG. 4 is a lower perspective view illustrating a coupling relationship between the front wing 210 and the lower spacer 220 and a coupling relationship between the lower spacer 220 and the duct housing 10, and FIG. 5 is a cross-sectional view illustrating the front wing 210 in a front-rear direction. FIG. 6 is a perspective view illustrating the duct housing 10 in a state in which the front wing 210 and related components are removed.

Specific descriptions will be provided with reference to FIGS. 4 to 6.

First, as in FIG. 4, lower rotating parts 211 are disposed at the corners of the rear sides (in other words, the driver seat side) of the lower portions of the vertically standing front wings 210, and rotation coupling parts 221 of the lower spacer 220 are coupled to the lower rotating parts 211. Similarly, as shown in FIG. 5, upper rotation parts 212 are also disposed at the corners of the rear sides of the upper portions of the front wings 210, and rotation coupling parts 231 of the upper spacer 230 are coupled to the upper rotation parts 212.

The lower spacer 220 is slidably guided in a lateral direction along a lower duct rail 110 formed in the lateral direction on an upper surface of the lower portion of the duct housing 10. Similarly, the upper spacer 230 is slidably guided in the lateral direction along an upper duct rail 120 formed in the lateral direction on a lower surface of the upper portion of the duct housing 10. The duct rails 110 and 120 may have linear or curved shapes (which will be described below).

In addition, lower hinge shafts 213 are provided at substantially central portions of the lower portions of the front wings 210, and upper hinge shafts 214 are provided at substantially central portions of the upper portions thereof. Meanwhile, lower hinge rails 130 having substantially an oval groove shape are formed in an inner surface of the lower portion of the duct housing 10, long diameters are formed to be positioned in a transverse direction (front-rear direction) of the duct housing 10, and short diameters thereof are formed to be positioned in a longitudinal direction (lateral direction). The lower hinge rails 130 are formed at positions corresponding to the lower hinge shafts 213 of the front wings 210. Symmetrically, upper hinge rails 140 having substantially an oval groove shape are formed in an inner surface of the upper portion of the duct housing 10, long diameters are formed to be positioned in the transverse direction of the duct housing 10, and short diameters thereof are formed to be positioned in the longitudinal direction thereof. The upper hinge rails 140 are formed at positions corresponding to the upper hinge shafts 214 of the front wing 210.

The lower hinge shafts 213 and the upper hinge shafts 214 of the front wings 210 are respectively inserted into and guided by the lower hinge rails 130 and the upper hinge rails 140 of the duct housing 10.

Figure 7A:
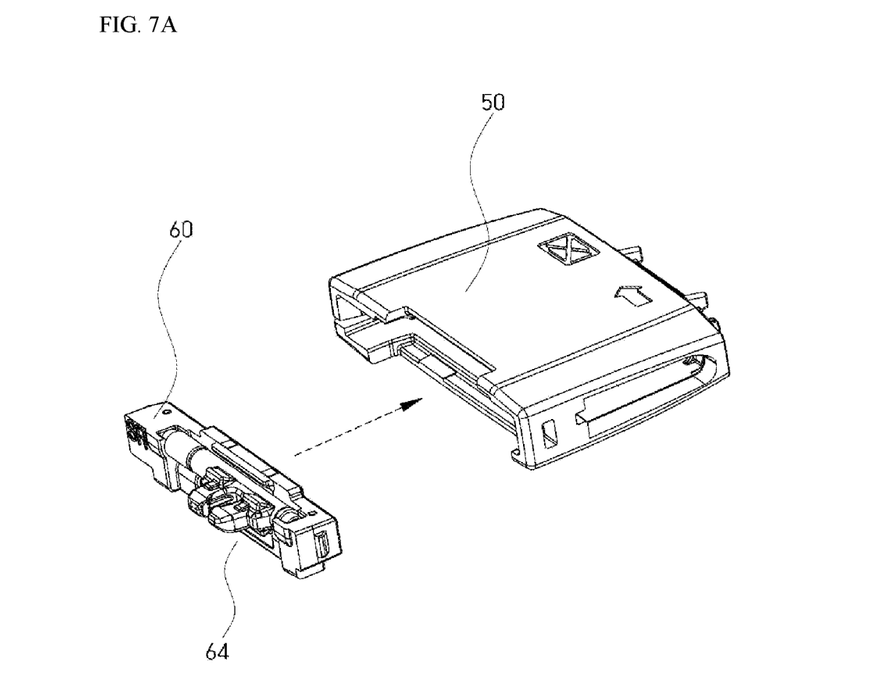
FIG. 7A is a perspective view illustrating a wing knob bar (64) according to the first embodiment, that is, a coupling view of the wing knob bar (64) and a front wing knob (60) connected to a rear wing knob (50)

As illustrated in FIG. 7A, due to the above-described front wing apparatus, a wing knob bar 64 according to the first embodiment protrudes only to the spacer bar 240 which is disposed relatively close to the rear side without protruding to a rotation axis of the front wing unlike the first bar 62 and the second bar 63 of the conventional wing knob bar 61 (see FIG. 2C) which is a long protrusion. By using the wing knob bar 64 having a new shape and improving a shape of the front wings 210 and a coupling method of the lower spacer 220 and the upper spacer 230, there is no wing that needs a cutting space among the front wings, all of lengths of the wings in the transverse direction (that is, widths in the front-rear direction) are the same, and thus a wind direction may be precisely adjusted. As described above, according to the present embodiment, only the cut portions C cut by a small amount thereof are disposed at the rear sides of several front wings 210 adjacent to the spacer bar 240.

Figure 7B:
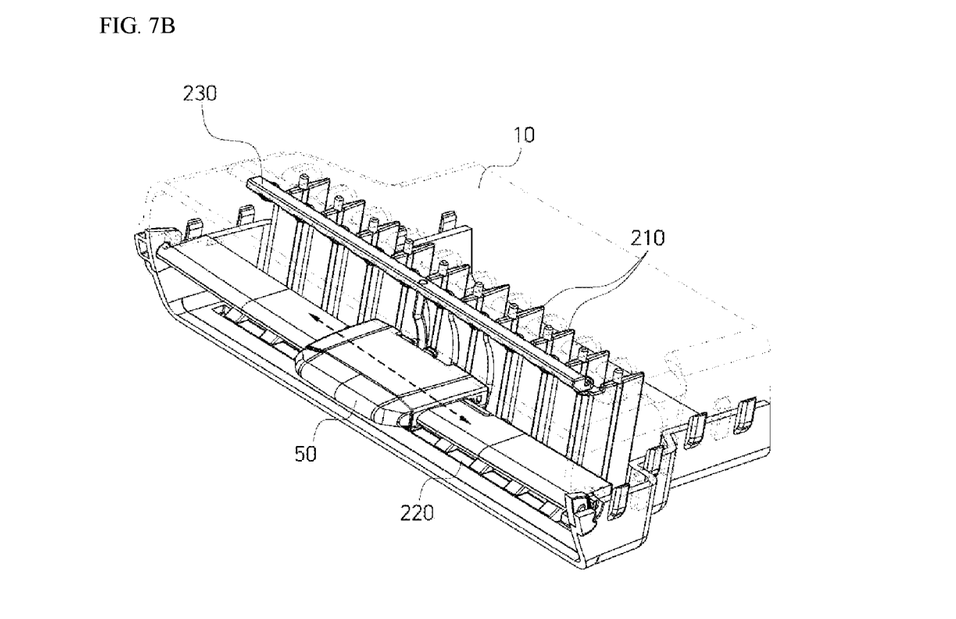
FIG. 7B is a perspective view for describing a principle in which all front wings (210) are rotated in a left-right direction by moving the rear wing knob (50) according to the first embodiment.

Due to the above structure, as shown in FIGS. 7A and 7B, when a wing knob (for example, the rear wing knob 50) is moved in the left-right direction, all of the front wings 210 are rotated in the left-right direction by the front wing knob 60 coupled to the rear wing knob 50 and the wing knob bar 64 coupled to or integrally formed with the front wing knob 60 having a new shape. That is, when the rear wing knob 50 is moved in the left-right direction, the spacer bar 240 fitted to the wing knob bar 64 moves in the left-right direction, the lower spacer 220 and the upper spacer 230 connected to the spacer bar 240 slide along the lower duct rails 110 and the upper duct rails 120 of the duct housing 10 in the left-right direction, and the front wings 210 are rotated in the left-right direction at the same time. In this case, the lower hinge shafts 213 and the upper hinge shafts 214 of the front wings 210 are guided along oval shaped trajectories of the lower hinge rails 130 and the upper hinge rails 140 of the duct housing 10 in a front-rear direction of an air vent so that a rotation operation in the left-right direction of the front wing 210 is smoothly performed.

As described above, the first embodiment of the present invention has a structure in which a protruding length of the wing knob bar 64 is minimized so as to minimize the cutting amount of the front wing 210. Since the spacer bar 240 linearly moves in the left-right direction, a difference in distance in the front-rear direction does not occur.

Although the rear wing knob 50 is generally designed so that an operation direction is the linear left-right direction, in a case in which the rear wing knob 50 is designed to operate along a slightly curved trajectory, the duct rail 110 may also be formed in a curved line to correspond thereto so that trajectories of the lower and upper spacers are formed in curved shapes.

The hinge shafts 213 and 214 disposed in the lower portions and the upper portions of the front wings 210 and the hinge rails 130 and 140 formed in the inner surfaces of the lower portion and the upper portion of the duct housing 10 will be further described.

First, the need for the hinge rails 130 and 140 is as follows. As in FIG. 5, a rotation operation of the front wing 210 is performed at the lower rotating part 211 disposed on the corner at the rear side of the lower portion of the front wing 210 and the rotation coupling part 221 of the lower spacer 220 (and the upper rotation part 212 disposed on the corner of the rear side of the upper portion of the front wing 210 and the rotation coupling part 231 of the upper spacer 230). In this case, since the lower and upper hinge shafts 213 and 214 of the front wing 210 and the lower and upper hinge rails 130 and 140 of the duct housing 10 are provided, a difference in distance in the front-rear direction that occurs due to the lower spacer 220 and the upper spacer 230 when the front wing 210 rotates may be offset.

Embodiments of the hinge rails 130 and 140 will be described below.

Figure 8A:
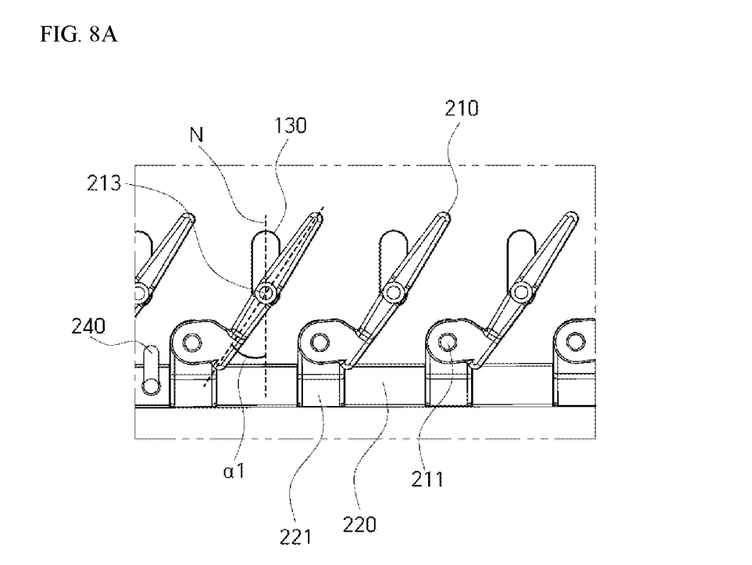
FIGS. 8A and 8B are plan views illustrating one example of a lower hinge rail (130) and an operation state of the front wing (210) according to the first embodiment.
Figure 8B:
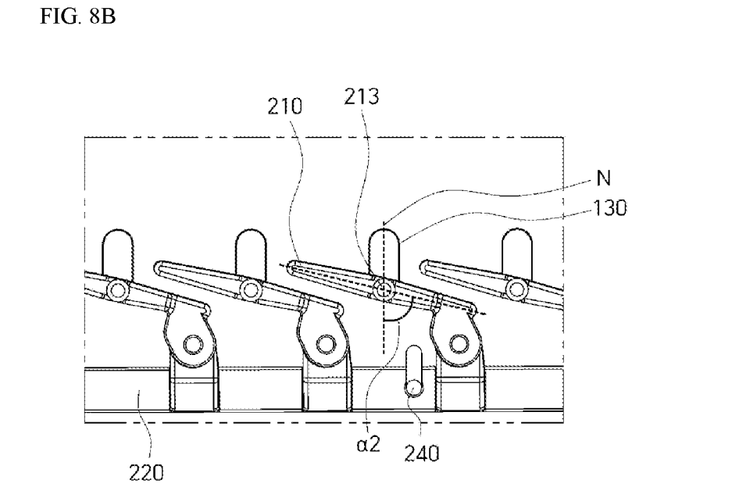
Figure 9A:
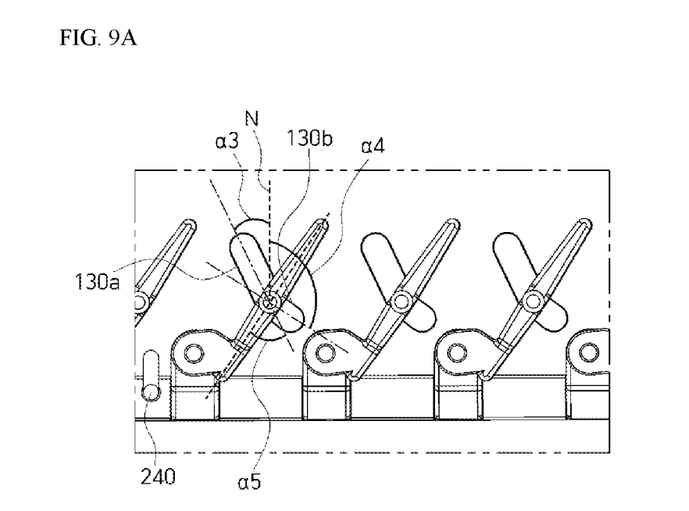
FIGS. 9A to 9C are plan views illustrating another example of the lower hinge rail (130) and an operation of the front wing (210) according to the first embodiment.
Figure 9B:
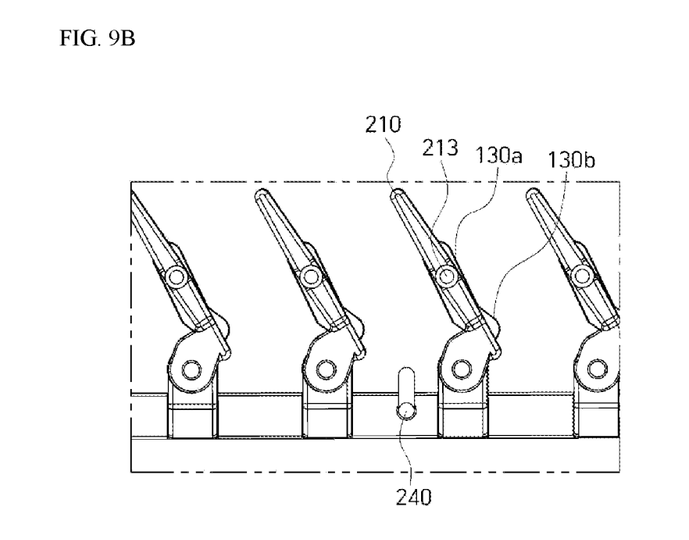
Figure 9C:
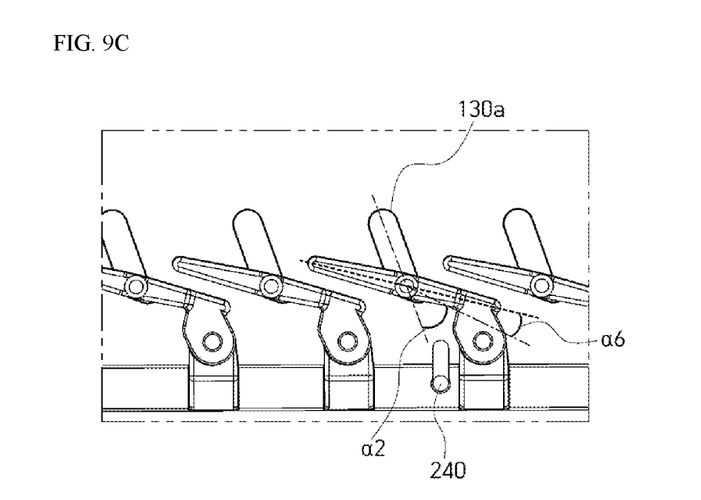

FIGS. 8A and 8B show one embodiment of the lower hinge rail 130, and FIGS. 9A to 9C show another embodiment of the lower hinge rail 130. Here, although the lower hinge rail 130 will be described for the sake of convenience, in the case of the upper hinge rail 140, the following description will be applied thereto in the same manner.

First, FIGS. 8A and 8B show the embodiment in which the hinge rail 130 is formed to extend in the front-rear direction. As in FIG. 8A, when a wind direction is adjusted in the left-right direction within a range of an angle $\alpha 1$ of about ±0 to 60° with respect to a reference normal line N (a long axis of the hinge rail 130), since a vector direction almost matches a position of the hinge rail 130 when the hinge shaft 213 of the front wing 210 is moved along the hinge rail 130 in the front-rear direction, catching does not occur when the hinge shaft 213 moves along the hinge rail 130 in the front-rear direction.

However, this embodiment has a disadvantage. As in FIG. 8B, when the lower spacer 220 moves a great deal in a rightward (or leftward) direction such that the front wing 210 is fully closed, an angle $\alpha 2$ between the hinge rail 130 and the front wing 210 (that is, a difference between an operation vector direction of the rear wing knob 50 and a movement direction of the front wing 210) becomes very large, and movement of the hinge shaft 213 along the hinge rail 130 is not smooth, and thus it is difficult to manipulate the rear wing knob 50 so that an excessive force is applied.

In order to reduce such a disadvantage, the hinge rail 130 is designed in the shape shown in FIG. 9A. The hinge rail 130 is formed as two stages having a first part 130a inclined by a first angle and a second part 130b inclined by a second angle. In this case, the first angle $\alpha 3$ is in the range of about 5 to 25° with respect to the reference normal line N, and the second angle $\alpha 4$ is an angle which is smaller than 180°−(5 to 25°) with respect to the reference normal line N.

By forming the hinge rail 130 as the two stages to be inclined with respect to the reference normal line N, when the front wing 210 is adjusted for a leftward wind direction as in FIG. 9A, an angle $\alpha 5$ of the front wing 210 with respect to the first part 130a of the hinge rail becomes greater than the angle $\alpha 1$ of FIG. 8A, and thus the hinge shaft 213 may slide more smoothly. In addition, when the front wing 210 is adjusted for a rightward wind direction as in FIG. 9B, since a difference in angle between the front wing 210 and the first part 130a of the hinge rail decreases more, a manipulation becomes more smooth, and when the front wing 210 is fully closed as in FIG. 9C, a new angle $\alpha 6$ is added to the angle $\alpha 2$ of FIG. 8B by the second part 130b of the hinge rail, a full close operation of the front wing 210 becomes smooth, and a load when a full closed state is returned to an open state is minimized.

According to the first embodiment of the present invention described above, by minimizing a length of the wing knob bar for adjusting the front wing of the air vent in the left-right direction, the cutting amount of the front wing applied due to interference with the operation trajectory of the wing knob bar may be minimized, and thus wind directivity can be improved. As described, even when the length of the wing knob bar is decreased and the cutting amount of the adjacent front wing is minimized, the wing knob bar is not separated.

Second Embodiment—Improvement of Noise Due to Gap Between Hinge Rail and Hinge Shaft In the first embodiment described above, as described with reference to FIG. 6, pairs of hinge rails, of which the number and positions are the same as those of the front wings 210, are provided in the upper portion and the lower portion of the duct housing 10. FIG. 6 shows the hinge rails 130 having the oval shape and formed in the inner surface of the lower portion of the duct housing 10, and the symmetrical hinge rails in the inner surface of the upper portion of the duct housing 10 are the same thereas. Accordingly, in the following description, only hinge rails 130 in a lower portion will be described.

In order to move the hinge shaft 213 of the front wing 210 in the hinge rail 130, a small gap is needed. However, this gap causes noise to be generated. In order to minimize gaps between all of the hinge shafts 213 of the front wings 210 and the hinge rails 130, a large mold modification cost and a great deal of time are required, and even when the mold modification is completed, the gaps or jam may occur due to an injection tolerance.

In the case of the first embodiment described above, since the hinge rails are formed in the duct housing at positions corresponding to all of the front wings, when the gaps are generated due to the injection tolerance of the duct housing, a problem of considering all hinge gaps between the upper and lower duct rails and the front wings is generated.

The second embodiment for solving the problem has a structure which prevents noise due to the structure of the hinge rails in which there are as many as the number of front wings 210 by setting a hinge rail at only one position in each of upper and lower portions of the duct housing 10 to significantly reduce the number of noise generation parts.

Figure 10:
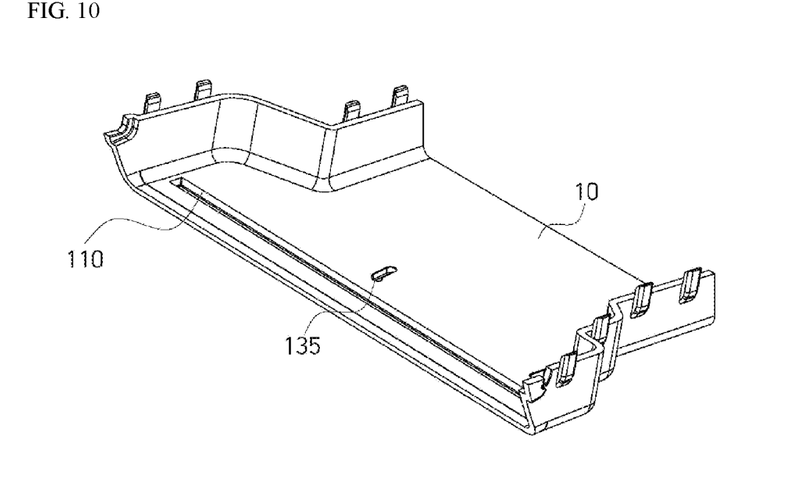
FIG. 10 is a perspective view illustrating a lower inner surface of a duct housing (10) for describing a second embodiment of the present invention.

As in FIG. 10, in order to implement this structure, a hinge rail 135 is formed at only one position in the duct housing 10 in the lower portion, and another hinge rail (not shown) is formed at only one position in the duct housing in the upper portion. Accordingly, a hinge shaft is not required to be provided in each of lower portions and upper portions of the front wings 210 to correspond thereto, and as in FIG. 11, a lower hinge shaft 215 is provided on only a front wing 210' corresponding to the one hinge rail 135. Similarly, an upper hinge shaft 216 coupled to an upper hinge rail (not shown) is formed in an upper portion of the front wing 210'.

Figure 11:
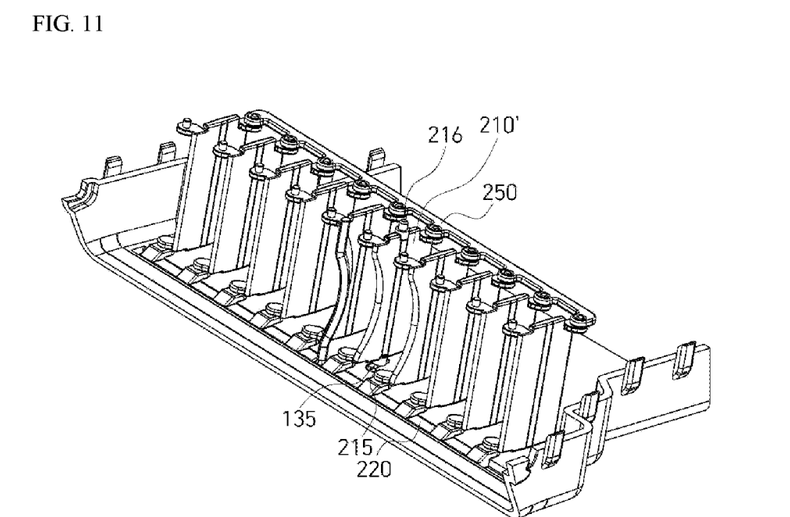
FIG. 11 is a perspective view illustrating a front wing apparatus according to the second embodiment.

However, as shown in FIG. 11, since the quantity of hinge rail 135 is only one, a front wing link 250, which organically connects the corresponding front wing 210' and the remaining wings, is additionally provided.

Figure 12:
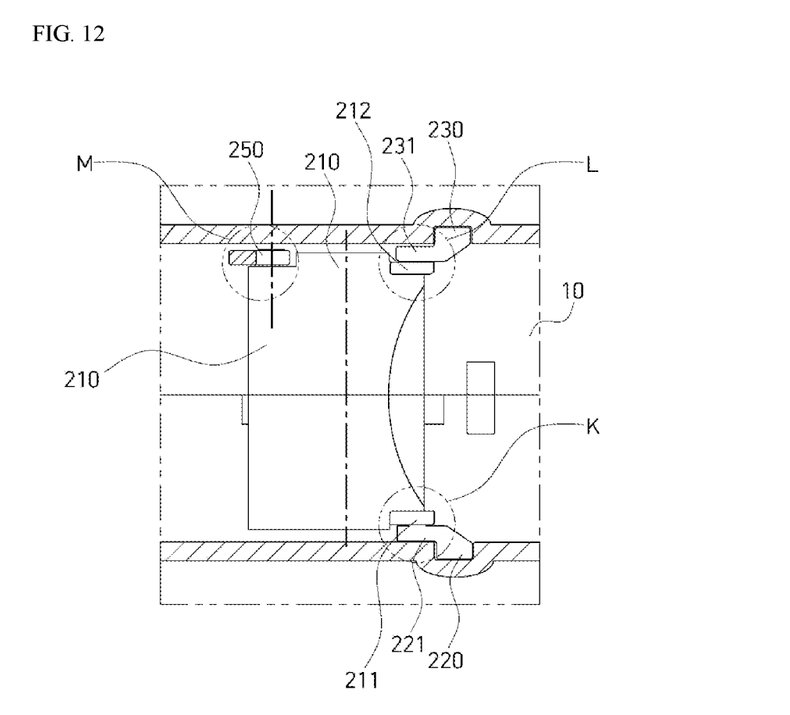
FIG. 12 is a cross-sectional view illustrating a front wing (210) which is cut in a front-rear direction and does not correspond to a hinge rail (135) according to the second embodiment.

FIG. 12 is a cross-sectional view illustrating the front wing 210, which is cut in a front-rear direction and does not correspond to the hinge rail 135, according to the present embodiment to which the front wing link 250 is added. As shown in FIG. 12, since three points of the front wing 210, which does not include the lower and upper hinge shafts 215 and 216, are fixed by three shaft points K, L, and M, an angle or position of the wing is not changed.

The front wing link 250 is manufactured of a Nylon-based material. Although a material of the duct housing 10 is a paint protection film (PPF) and a size tolerance is generated according to an injection condition, ambient temperature, and the like, since the front wing link 250 is formed of the Nylon-based material such as PA6 and is small, there is almost no size tolerance.

As described above, according to the second embodiment, since the hinge rail is formed at one position in the upper portion and the hinge rail is formed at one position in the lower portion of the duct housing, noise generated due to gaps between the upper and lower hinge shafts of the front wing and the upper and lower hinge rails of the duct rail can be significantly removed, and causal factors of the noise, excluding noise due to vehicle vibration and air conditioner wind, can be minimized.

Third Embodiment—Improvement of Exterior Design Degradation Due to Exposure of Rotation Coupling Part of Lower/Upper Spacer As in FIG. 4 showing the structure of the previous first embodiment, since the rotation coupling part 221 of the lower spacer 220 protrudes from the duct rail 110 (although not illustrated in FIG. 4, the rotation coupling part 231 (see FIG. 5) of the upper spacer 230 also protrudes similarly), these portions are exposed to the outside of a blower port and become causes of exterior design degradation. In addition, this structure is a structure in which a jam or gap is generated so that a malfunction or noise is easily generated when coupled to the duct rails 110 and 120 due to injection tolerances of the lower and upper spacers 220 and 230 and the duct housing 10. In addition, resistance against movement of discharged wind is generated due to the structure in which the rotation coupling parts 221 and 231 protrude.

Figure 13:
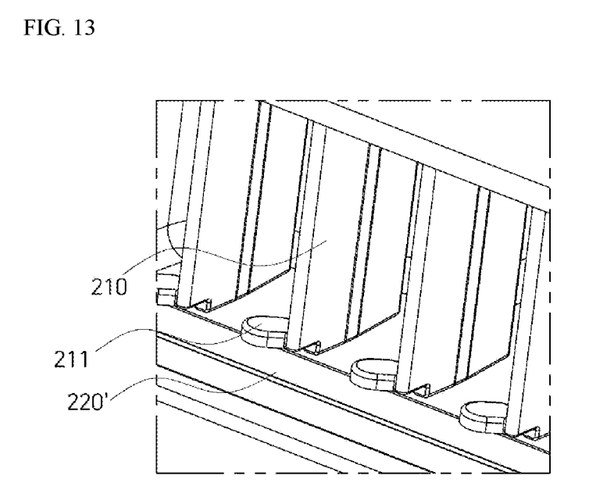
FIG. 13 is a perspective view illustrating a lower spacer (220') for describing a third embodiment of the present invention.
Figure 14:
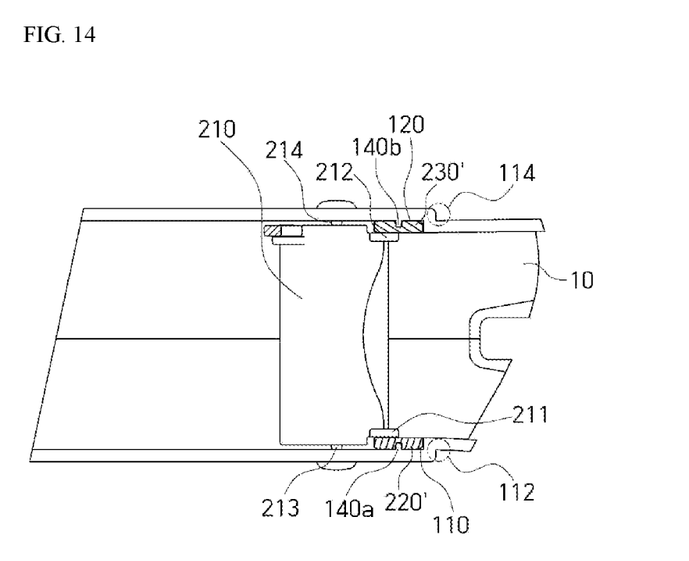
FIG. 14 is a cross-sectional view illustrating a front wing (210) cut in a front-rear direction according to the third embodiment.

As in FIGS. 13 and 14, in order to lessen such a problem, the present third embodiment has a structure in which hinge structures of a lower spacer 220' and an upper spacer 230' are not employed to minimize exposure to the outside so as to minimize noise caused by gap generation due to a conventional structure.

Referring to FIG. 13 to describe a configuration of the third embodiment, a rotation coupling part 221 (see FIG. 4) disposed on a conventional lower spacer 220 is not provided, and a lower rotation part 211 of a front wing 210 is rotatably and directly coupled to the lower spacer 220' manufactured to have a flat surface without having a difference in level between the lower rotation part 211 and an upper surface of the lower spacer 220'. The case of the upper spacer 230' is the same thereas (which is symmetrical to a structure of the lower spacer). FIG. 14 (cross-sectional view cut in a front-rear direction), which shows an upper and lower structure of the third embodiment, will be referred in order to describe a clearer structure. FIG. 14 is the view corresponding to FIGS. 10 and 12 in the case in which only one hinge rail 135 is set in the second embodiment.

Unlike the embodiment of FIG. 5, in a duct housing 10, portions 112 and 114, to which the lower spacer 220' and the upper spacer 230' are coupled, are designed in a structure having an "L" shape. Specifically, duct rails 110 and 120 are formed as open grooves having an "⌐" shape (at a lower side) and a "⌐" shape (at an upper side) instead of an "U" shape (at the lower side) and a "∩" shape (at the upper side) as in FIGS. 5 and 6. Accordingly, even in a case in which there is an injection tolerance, an offset margin of the tolerance becomes larger due to the open grooves, and thus noise due to jamming of the lower spacer 220' and the upper spacer 230' is reduced.

Meanwhile, since each of the duct rails 110 and 120 has the open shape having one open side, there is a risk of the lower spacer 220' and the upper spacer 230' being separated therefrom, and thus protruding rails 140a and 140b are formed in middles of the duct rails 110 and 120 to prevent the separation. As another example, protruding rails 140a and 140b may also be formed on the lower spacer 220' and the upper spacer 230' instead of the duct rails 110 and 120.

Meanwhile, noise may be generated due to gaps between the lower spacer 220' and the upper spacer 230' and the duct rails 110 and 120 which are coupled and due to a sliding operation of the lower spacer 220' and the upper spacer 230'. When the present invention is designed to minimize the gaps, the two will come tightly into contact with each other to generate another noise when the sliding operation is performed.

In order to reduce the noise not only in the case in which the gap is small but also in the case in which the gap is large, a method, in which a tension is applied to each of a lower surface and an upper surface of the duct housing 10 so that the tension is applied to each of the upper spacer 230' and the lower spacer 220' by the lower surface and the upper surface of the duct housing 10 when the upper spacer 230' and the lower spacer 220' are assembled, is added In order to apply the tension to the lower surface and the upper surface of the duct housing 10, a tension structure is formed on the upper surface and/or lower surface. The tension structure allows the upper surface and/or lower surface of the duct housing 10 to have a vertical elastic force. Accordingly, even when the present invention is designed so that there is no gap between the lower spacer 220' and the upper spacer 230' and the duct rails 110 and 120 of the duct housing 10, a smooth sliding operation of the duct rails 110 and 120 is performed due to the tension of the upper and lower surfaces of the duct housing 10. Accordingly, the noise generated due to the gap is reduced. In addition, conversely, even when the gap is large, the gap is offset due to the tension of the upper and lower surfaces of the duct housing 10, and thus the lower spacer 220' and the upper spacer 230' are pressed against the duct rails 110 and 120 so that the noise is reduced when the sliding operation is performed.

Figure 15:
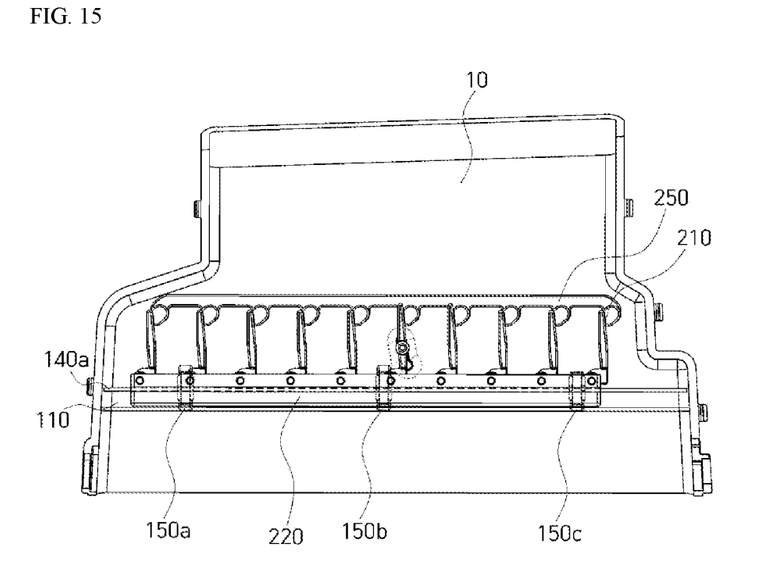
FIG. 15 is a plan view illustrating a lower portion of a duct housing (10) for describing a tension structure according to the third embodiment.

The tension structure may be implemented as, for example, slot holes 150a, 150b, and 150c in the front-rear direction formed as in FIG. 15. At least three pairs of slot holes 150a, 150b, and 150c, in which one pair of slot holes are formed in the upper surface and the lower surface of the duct housing 10, are formed. The at least three pairs of slot holes 150a, 150b, and 150c are formed in a lower duct rail 110 and an upper duct rail 120 coupled to the lower spacer 220' and the upper spacer 230' to prevent discharged wind from leaking.

Figure 16:
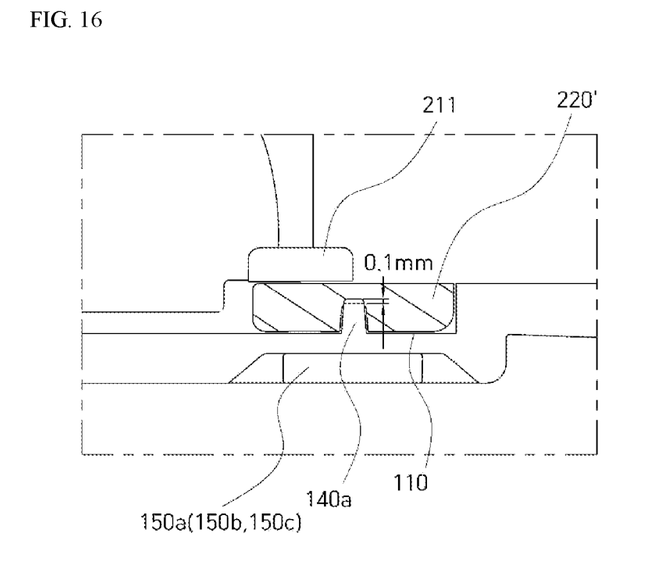
FIG. 16 is an enlarged view illustrating a portion of a protruding rail (140a) of FIG. 14.

The upper surface and the lower surface of the duct housing 10 receive tension forces due to cut holes of the slot holes 150a, 150b, and 150c (that is, have vertical elasticity) in the front-rear direction. In order to apply the tension as described above, as in FIG. 16 (FIG. 16 is an enlarged view illustrating a portion of a protruding rail 140a of FIG. 14), dimensions of the lower spacer 220' and the protruding rail 140a are designed so that the lower spacer 220' overlaps an upper surface of the protruding rail 140a of the lower duct rail 110 of the duct housing 10 by about 0.1 mm. Even in the case of the upper spacer 230', the present invention is designed in accordance with the case described above.

According to the third embodiment described above, by removing a rotation coupling part 221 of the lower spacer 220' and a rotation coupling part 231 of the upper spacer 230' and changing the shapes of the duct rails 110 and 120 of the duct housing 10, protruding portions of the rotation coupling parts of the lower and upper spacers 220' and 230' are removed and are not exposed from an exterior so that a factor of reducing wind movement is removed. In addition, the noise generated due to the gap is minimized when the lower and upper spacers 220' and 230' slidably move in the duct rails 110 and 120.

The following benefits can be obtained from each of the embodiments of the present invention described above.

According to the first embodiment of the present invention, by minimizing the length of the wing knob bar for adjusting the front wing of the air vent in the left-right direction, the cutting amount of the front wing applied due to interference with the operation trajectory of the wing knob bar can be minimized, and thus wind directivity can be improved. As described, the length of the wing knob bar is decreased, the cutting amount of the adjacent front wing is minimized, and the wing knob bar is also not separated.

In addition, according to the second embodiment, since the hinge rail is formed at one position in the upper portion and the hinge rail is formed at one position in the lower portion of the duct housing, noise generated due to gaps between the upper and lower hinge shafts of the front wing and the upper and lower hinge rails of the duct rail can be significantly removed, and causal factors of the noise, excluding noise due to vehicle vibration and air conditioner wind, can be minimized.

In addition, according to the third embodiment, the protruding portions of the rotation coupling parts of the lower and upper spacers are removed and are not exposed from the exterior so that design quality of the exterior is improved and a factor of reducing wind movement is removed. In addition, the noise generated due to the gap is minimized when the lower and upper spacers slidably move in the duct rails.

As described above, the structure and operation of the present invention have been described in detail with reference to the accompanying drawings. However, these are only examples and may also be variously changed and modified within the technical spirit of the present invention by those skilled in the art. Therefore, the scope of the present invention should not be limited to the embodiments described above and should be defined by the appended claims.

What is claimed is:

1. A front wing apparatus for a car, which is disposed in a duct housing of a car air vent and configured to rotate in a left-right direction by a wing knob exposed to the outside of the duct housing, the front wing apparatus comprising:
    a plurality of front wings;
    a lower spacer which is rotatably coupled to lower portions of the plurality of front wings and laterally connects the lower portions of the plurality of front wings;
    an upper spacer which is rotatably coupled to upper portions of the plurality of front wings and laterally connects the upper portions of the plurality of front wings;
    a spacer bar which vertically connects the lower spacer and the upper spacer;
    a wing knob bar to which the spacer bar is fitted and which is coupled to the wing knob;
    lower hinge shafts protruding from the lower portions of the plurality of front wings;
    upper hinge shafts protruding from the upper portions of the plurality of front wings;
    lower hinge rails which are disposed in a lower portion of the duct housing to guide the lower hinge shafts of the front wings; and
    upper hinge rails which are disposed in an upper portion of the duct housing to guide the upper hinge shafts of the front wings,
    wherein, when the wing knob is rotated in the left-right direction, the spacer bar fitted to the wing knob bar is moved in the left-right direction to cause the front wings, rotatably coupled to the lower spacer and the upper spacer connected to the spacer bar, to respectively rotate around pairs of the lower hinge shafts and the upper hinge shafts.

2. The front wing apparatus of claim 1, wherein:
    the front wing includes a lower rotating part disposed on the lower portion to be rotatably coupled to the lower spacer and an upper rotation part disposed on the upper portion to be rotatably coupled to the upper spacer;
    the lower spacer includes a lower rotation coupling part rotatably coupled to the lower rotating part; and
    the upper spacer includes an upper rotation coupling part rotatably coupled to the upper rotation part.

3. The front wing apparatus of claim 2, wherein:
the lower rotation coupling part of the lower spacer does not have a difference in level with respect to an upper surface of the lower spacer; and
the upper rotation coupling part of the upper spacer does not have a difference in level with respect to an upper surface of the upper spacer.

4. The front wing apparatus of claim 3, further comprising a tension structure which allows at rotation one of a lower surface and an upper surface of the duct housing to have a vertical elastic force.

5. The front wing apparatus of claim 4, wherein the tension structure includes a slot hole in the at least one of the upper surface and the lower surface of the duct housing.

6. The front wing apparatus of claim 1, wherein:
the lower spacer is guided by a lower duct rail disposed in a lower portion of the duct housing in a lateral direction and slides in the lateral direction; and
the upper spacer is guided along an upper duct rail disposed in an upper portion of the duct housing in the lateral direction and slides in the lateral direction.

7. The front wing apparatus of claim 6, wherein each of the lower and upper duct rails includes a linear rail.

8. The front wing apparatus of claim 6, wherein:
the lower duct rail has a "⌐" shape; and
the upper duct rail has a "⌐" shape.

9. The front wing apparatus of claim 6, wherein the lower and upper duct rails include protruding rails configured to prevent the lower spacer and the upper spacer from being separated from the lower and upper duct rails.

10. The front wing apparatus of claim 6, wherein the lower spacer and the upper spacer include protruding rails configured to prevent separation from the lower and upper duct rails.

11. The front wing apparatus of claim 1, wherein:
the lower hinge rail has a first dimension in a transverse direction, which is a front-rear direction, of the duct housing and a second dimension in a longitudinal direction, which is a lateral direction, of the duct housing, the first dimension being greater than the second dimension; and
the upper hinge rail has a third dimension in the transverse direction of the duct housing and a fourth dimension in the longitudinal direction of the duct housing, the third dimension being greater than the fourth dimension.

12. The front wing apparatus of claim 1, wherein:
the lower hinge rail includes a first part inclined by a first angle with respect to a reference normal line in the transverse direction, which is a front-rear direction, of the duct housing and a second part inclined by a second angle with respect to the reference normal line; and
the upper hinge rail includes a third part inclined by a third angle with respect to the reference normal line in the transverse direction of the duct housing and a fourth part inclined by a fourth angle with respect to the reference normal line.

13. The front wing apparatus of claim 12, wherein:
the first angle is an angle of 5 to 25° with respect to the reference normal line, and the third angle is an angle of 5 to 25° with respect to the reference normal line; and
the second angle is an angle of 155 to 175° with respect to the reference normal line, and the fourth angle is an angle of 155 to 175° with respect to the reference normal line.

14. The front wing apparatus of claim 1, further comprising:
a lower hinge shaft protruding from the lower portion of one front wing of the plurality of front wings;
an upper hinge shaft protruding from the upper portion of the one front wing;
a lower hinge rail which is disposed in a lower portion of the duct housing to guide the lower hinge shaft of the one front wing;
an upper hinge rail which is disposed in an upper portion of the duct housing to guide the upper hinge shaft of the one front wing; and
a front wing link which rotatably connects the one front wing and remaining front wings of the plurality of front wings.

15. The front wing apparatus of claim 14, wherein:
the lower hinge rail has a first dimension in a transverse direction, which is a front-rear direction, of the duct housing and a second dimension in a longitudinal direction, which is a lateral direction, of the duct housing, the first dimension being greater than the second dimension; and
the upper hinge rail has a third dimension in the transverse direction of the duct housing and a fourth dimension in the longitudinal direction of the duct housing, the third dimension being greater than the fourth dimension.

16. The front wing apparatus of claim 14, wherein:
the lower hinge rail includes a first part inclined by a first angle with respect to a reference normal line in a transverse direction, which is a front-rear direction, of the duct housing and a second part inclined by a second angle with respect to the reference normal line; and
the upper hinge rail includes a third part inclined by a third angle with respect to the reference normal line in the transverse direction of the duct housing and a fourth part inclined by a fourth angle with respect to the reference normal line.

17. The front wing apparatus of claim 16, wherein:
the first angle is an angle of 5 to 25° with respect to the reference normal line, and the third angle is an angle of 5 to 25° with respect to the reference normal line; and
the second angle is an angle of 155 to 175° with respect to the reference normal line, and the fourth angle is an angle of 155 to 175° with respect to the reference normal line.

* * * * *